May 22, 1934.   L. A. HYLAND   1,959,827
PIEZO-ELECTRIC CRYSTAL APPARATUS
Filed Sept. 6, 1933
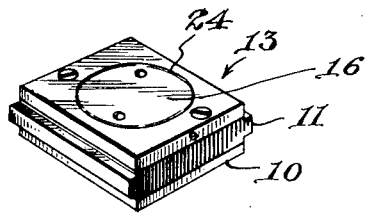
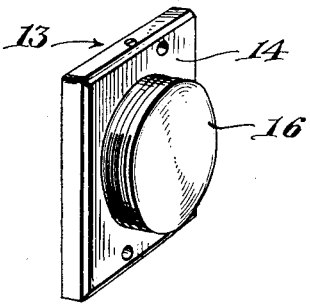 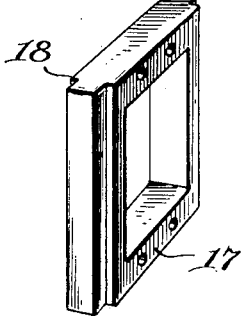 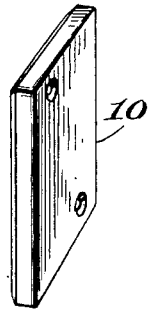
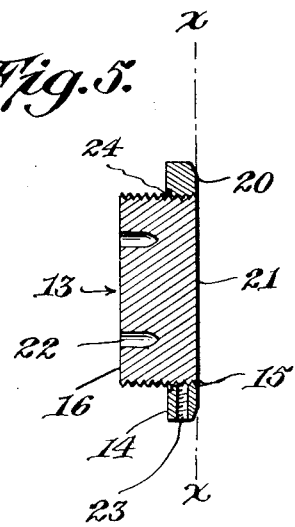 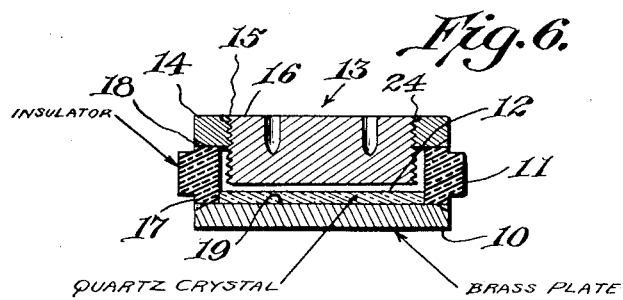
Inventor
Lawrence A. Hyland
By Charles W. Hills
Attorney Patented May 22, 1934

1,959,827

UNITED STATES PATENT OFFICE 1,959,827

PIEZO-ELECTRIC CRYSTAL APPARATUS

Lawrence A. Hyland, Washington, D. C.

Application September 6, 1933, Serial No. 688,385

4 Claims. (Cl. 171—327)

This invention relates broadly to piezo electric crystal apparatus and more particularly to an improved construction of piezo electric crystal holder.

One of the objects of this invention is to provide a piezo electric crystal holder for mounting a piezo electric crystal element in such a manner that oscillations over a broad range of frequencies may be readily initiated and may be sustained with a high degree of efficiency.

Another object of this invention is to provide an improved construction of a piezo electric crystal holder comprising an electrode capable of an exceedingly accurate and fine adjustment with respect to the piezo electric crystal element, and an arrangement of parts adapted to maintain the electrode and the crystal in proper relation to each other for sustained oscillation of the crystal over a wide range of temperature.

It is also an object of this invention to provide a novel method of constructing and fashioning an electrode element of a piezo electric crystal holder.

Other and further objects of the invention reside in the construction of the piezo electric crystal holder as described more fully in the specification hereinafter following by reference to the accompanying drawing, in which:

Figure 1 is a plan view in perspective of the holder.

Figures 2, 3 and 4 present an exploded view of the holder showing in perspective the upper electrode, the insulating frame and the lower electrode, respectively.

Figure 5 is a view, in section, of the upper electrode.

Figure 6 is an end view, in section, of an assembled oscillator, of the air-gap type.

As shown in the drawing:

A metal electrode 10 is secured by screws, or the like, to a frame 11, of insulating material, and a piezo electric crystal 12 rests on the plate 10. The upper electrode 13 comprises a metal plate 14 which is bored and threaded at 15, and threadedly inserted in the bore is a metal plug 16 which projects between the sides of the frame into spaced relation with the crystal 12, providing a small air-gap.

The plate 14 and the plug 16 are of unlike metals so that when the holder is subjected to variations in temperature under service conditions the plug will remain a snug fit in the bore and its working face will substantially retain its initial position with respect to the crystal due to the difference in the coefficients of expansion of the metals. In a preferred form of the invention the plate 14 is of brass and the plug 16 is of bronze. The threads on the plug 16 are of the order of 48 threads to the inch.

In the preferred form of the invention it has been found that the holder may be subjected to wide and rapid changes in temperature without evidence of side-play between the plug and the plate or of the turning of the plug due to creeping, and the oscillator, because of this constancy of adjustment, is stable in its operation.

The piezo electric oscillator is an instrument of precision, but it has heretofore been found that under the service conditions obtaining in military and naval operations when the oscillator is moved about and is subjected to wide variations in climate it has lacked stability in performance due to changes in the relationship of the parts of the holder. The piezo electric crystal holder of this invention is adapted to provide stability of operation of the oscillator under the adverse conditions just referred to.

The upper and lower faces 17 and 18, respectively, of the insulating frame are made parallel with great care. The upper face 19 of the lower electrode 10 is also made smooth and parallel with the face 18 of the frame.

In the method of forming the upper electrode 13, the plug 16 is threadedly inserted in the plate 14 until its entering end projects slightly beyond the lower face 20 of the plate. Then, as best shown in Figure 5, the plate and the plug are worked as a unit in grinding and polishing operations until the lower face 21 of the plug and the face 20 of the plate are exactly parallel, as is indicated by the line $x-x$ of Figure 5.

The faces 20 and 21 are initially parallel with the faces 17, 18 and 19, and since the threads on the plug are exceedingly fine the face 21 will be substantially parallel with the face 19, and with the crystal, when the plug is turned to project between the sides of the frame 11, almost into contact with the crystal 12.

The plug 16 is provided with recesses 22 so that a suitable tool may be used in turning the plug, and the plate 14 is bored and threaded at 23 to receive a lock screw.

The plate 10 and the plate 14 are beveled at the edge to form a pocket with the frame 11 to receive a sealing compound to hermetically seal the holder.

The plug 16 is tightly fitted in the plate 14, and the edge of the plate bounding the bore 15 is beveled to provide a recess to receive a sealing compound as is indicated at 24.

Since the plug 16 is of a metal different from that of the plate 14, an adjustable electrode is provided capable of exceedingly close adjustment, for the threads on the threaded parts may be exceedingly fine without there being the probability of the parts binding or of the threads being stripped when the plug is turned.

It has been a common practice to use a lubricant when very fine threads were employed on adjustable parts of holders, and the lubricant ultimately found its way on to the face of the crystal and seriously impaired its operating efficiency.

In the use of the adjustable electrode of this invention a lubricant is not necessary, and thus the hazard of operation above mentioned is not present.

I claim:

1. A piezo electric crystal holder comprising an open-ended frame of insulating material, a metal plate closing one end of said frame to provide an electrode, another metal plate secured to the other end of said frame to support an electrode, and a metal electrode plug screw threaded in said another plate and turnable to project in said frame into spaced opposed relation with a piezo electric crystal positioned in the frame and resting on said first-named plate, said plug being of a metal different from that of said another plate.

2. A piezo electric crystal holder comprising an open-ended frame of insulating material provided with parallel faces on opposite sides thereof, a smooth metal plate secured to said frame and presenting a contacting face parallel to a contacting face of said frame, another smooth metal plate secured to said frame and presenting a contacting face parallel to a contacting face of said frame, a metal plug screw threaded in said another metal plate and projecting in said frame, said plug being of a material different from that of said another metal plate and having a smooth face substantially parallel with that of the contacting face of said another plate.

3. A piezo electric crystal holder comprising an open-ended frame of insulating material, a metal plate closing one end of said frame to provide an electrode, another metal plate secured to the other end of said frame to support an electrode, a metal electrode plug screw threaded in said another plate and turnable to project in said frame into spaced opposed relation with a piezo electric crystal positioned in the frame and resting on said first-named plate, said plug being of a metal different from that of said another plate, and means defining a recess in said another plate to receive a sealing compound to hermetically seal said plug in said plate.

4. A piezo electric crystal holder comprising an open-ended insulating frame, a metal electrode plate closing one end of said frame, a brass plate secured to the other end of said frame, and a bronze electrode plug screw threaded in said brass plate and turnable to project into said frame into spaced opposed relation with a piezo electric crystal therein.

LAWRENCE A. HYLAND.